United States Patent [19]

Ramaswamy

[11] Patent Number: 4,970,616
[45] Date of Patent: Nov. 13, 1990

[54] RECORDING HEAD TO MINIMIZE UNDERSHOOTS IN READBACK PULSES

[75] Inventor: Seshadri Ramaswamy, Sudbury, Mass.

[73] Assignee: Digital Equipment Corporation, Maynard, Mass.

[21] Appl. No.: 233,322

[22] Filed: Aug. 17, 1988

[51] Int. Cl.$^5$ .............................................. G11B 5/187
[52] U.S. Cl. ...................................................... 360/122
[58] Field of Search ................................. 360/122, 126

[56] References Cited

U.S. PATENT DOCUMENTS 4,422,118 12/1983 Helle ..................................... 360/126
4,685,012 8/1987 DeWit .............................. 360/126 X
4,799,118 1/1989 Yamada ........................... 360/122 X Primary Examiner—A. J. Heinz
Attorney, Agent, or Firm—Fish & Richardson

[57] ABSTRACT

A recording head having first and second poles with first and second pole tips separated by a gap, a cross-section of one of the pole tips including two regions, one larger than the other, one of the regions being adjacent to the gap. A cross-section of a second pole tip may include two regions, one larger than the other, one of the regions being adjacent to the gap. This pole tip design, where the width of the poles along their outer edges are considerably larger or considerably smaller compared to their width at the gap, leads to minimal undershoots in the readback pulses of thin film heads.

32 Claims, 2 Drawing Sheets

TYPICAL ISOLATED PULSE FROM A THINFILM HEAD

CONTOURS OF ONE-HALF LONGITUDINAL FIELD - RECTANGULAR POLES

CONTOURS OF ONE-HALF LONGITUDAL FIELD - TRAPEZOIDAL POLES

RECORDING HEAD TO MINIMIZE UNDERSHOOTS IN READBACK PULSES

BACKGROUND OF THE INVENTION

The present invention relates to design of a magnetic recording head to minimize undershoots in readback pulses.

Magnetic recording heads are used to record and read information made up of alternating magnetization patterns on a magnetic recording medium. It is desirable to have the highest level of signal-to-noise ratio arising from the interaction between the recording head and medium. When reading recorded data from a recording medium, a higher signal-to-noise ratio takes the form of a desired central pulse achieving a higher amplitude relative to background interference (from neighboring pulses and other sources).

When a thin film magnetic recording head passes over a magnetic medium during the read operation, the generated waveform contains a leading and a trailing undershoot, in addition to the central pulse. These undershoots contain high frequency components which are comparable to the central pulse. If the central pulse were isolated, the magnitude of the undershoots would be approximately five percent to fifteen percent of the amplitude of the isolated pulse. These undershoots can lead to a forty percent reduction in the amplitude threshold margin of a central pulse and the pulse shape effects can reduce the window margin by fifty percent.

There are various known methods for making thin film recording heads. In one typical method, an insulating base layer of $Al_2O_3$ is deposited on a substrate. One such substrate is known in the industry as ALSIMAG. Next, a seed layer, such as NiFe, is sputtered over the insulating base layer of $Al_2O_3$. Photoresist is then spun over the seed layer and a pole piece pattern is formed in the photoresist by photolithographic techniques. After the resist is developed, pole material, such as NiFe, is deposited through the mask by means of electroplating.

After the plating of the first pole piece, a gap layer is deposited, such as a thin layer of $Al_2O_3$. A coil structure with surrounding layers of insulation is also formed at the yoke of the pole structure. The second pole piece is next plated onto this structure. Normally, the width of the second pole at its tip (i.e. at the air bearing surface) is plated to be narrower than the width of the first pole at its tip. This configuration is designed to avoid magnetic shorts occurring between the two pole pieces.

Both pole pieces are plated to be considerably wider than the final pole width desired. Thereafter, a thick resist is patterned on the second pole tip and over the yoke. The width of this pattern ultimately will determine the final width of the poles of the gap. Next, by a process known as ion milling, the excess magnetic material which has been plated along the width of the two pole tips is removed. In the normal process, the ion beam is impinged upon the head normal to the wafer surface during the first part of the milling process. This vertical milling leads to redeposition of magnetic material across the gap where it has been exposed during the milling process. This causes a magnetic short, which is removed by further milling.

The track trimming process as described above is ordinarily employed in the industry for obtaining uniform widths for both poles, where ninety degree walls are sought in the longitudinal direction. In practice, however, the process results in approximately 83° wall angles. Such a deviation from the 90° angle happens to reduce the magnitude of the undershoots from a recording head up to two percent. However, the attendant increase of the first pole in width at the gap leads to increased read/write fringing.

Undershoots can also be reduced by producing particularly thick poles—on the order of seven microns in thickness. Such reduction can amount to four percent in the size of the undershoots. However, this reduction does not outweigh the substantial increase in processing complexity to achieve such thick poles, particularly for poles made in the track trimming process. For example, inordinate trimming times would be required for the thicker poles.

SUMMARY OF THE INVENTION

In one aspect of the invention, a method is provided to reduce undershoots by configuring a magnetic recording head which includes first and second poles defining first and second pole tips, respectively, separated by a gap, the first pole tip cross-section including a first and second region, the first region larger than the second region, one of the regions being adjacent to the gap.

In another aspect of the invention, a method is provided to reduce undershoots by configuring a magnetic recording head which includes first and second poles defining first and second pole tips, respectively, separated by a gap, the first pole tip cross-section including a first and second region, the first region larger than the second region, one of the regions being adjacent to the gap, the second pole tip including two regions, one larger than the other, one of the regions being adjacent to the gap.

In one embodiment of the present invention, a magnetic recording head includes first and second poles defining first and second pole tips, respectively, separated by a gap, the first pole tip cross-section including a first and second region, the first region larger than the second region, one of the regions being adjacent to the gap.

In another embodiment, the first pole tip cross-section includes a first and second region, the first region larger than the second region, one of the regions being adjacent to the gap, the second pole tip including two regions, one larger than the other, one of the regions being adjacent to the gap, the cross-sectional area of the first pole tip being larger than the cross sectional area of the second pole tip.

Another embodiment of the invention includes a magnetic recording head having first and second pole pieces with first and second pole tips separated by a gap. The first pole tip cross-section includes a relatively rectangular portion adjacent the gap and a relatively trapezoidal portion adjacent the rectangular portion. The second pole piece cross-section includes a relatively rectangular portion adjacent the gap and a relatively trapezoidal portion adjacent the rectangular portion. Both pole portions have substantially parallel walls adjacent the gap.

In yet another embodiment of the invention, a reduced section of the first pole piece reduces the leading undershoot in a waveform developed by the head reading a transition on a magnetic medium, and an enlarged portion of the second pole piece reduces the trailing undershoot of the waveform.

The present invention is directed to reduction of leading and trailing undershoots as will permit manufacture of a recording head having increased signal-to-noise ratio. The invention reduces amplitude changes and peak shifts caused by undershoots, as permits improved reading and writing between a recording head and magnetic medium. The new configuration of the first pole piece can reduce the leading undershoot in a waveform developed by the head from a transition on a magnetic medium. The new configuration of the second pole piece can reduce the trailing undershoot in a waveform developed by the head from a transition on a magnetic medium.

Other advantages and features will become apparent from the following description of the preferred embodiment and from the claims.

DESCRIPTION OF THE PREFERRED EMBODIMENT

Figure 1:
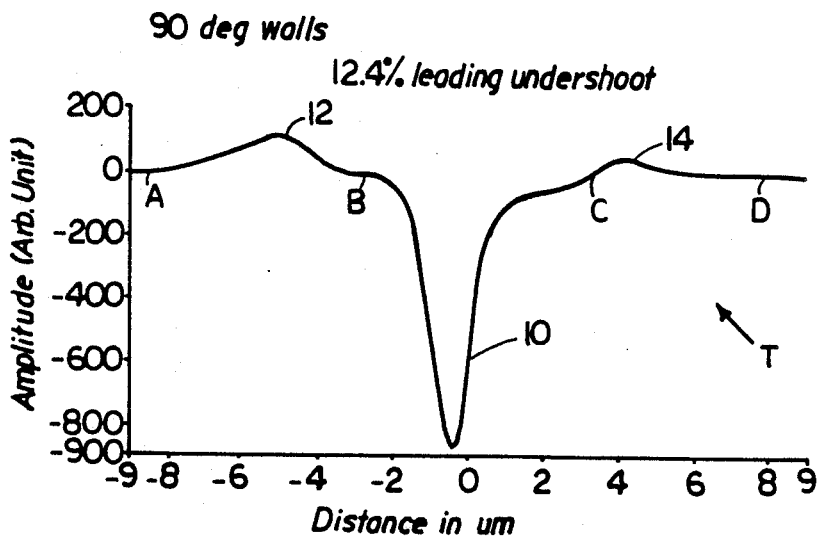
FIG. 1 is a graphic representation of a typical waveform from a single transition generated by a thin film magnetic recording head.

When a data bit is recorded on a magnetic medium it may be understood as taking the form of a collection (called a "transition") of magnetic charges stored on a section (called a "track") of the medium. A typical waveform generated by a thin film recording head reading a single transition on a magnetic medium track is shown in FIG. 1. Here the central pulse 10 is arbitrarily shown having negative amplitude. The waveform is flanked by a leading undershoot 12 and trailing undershoot 14, each of which having positive amplitudes. In FIG. 1, the readback waveform T is seen to begin at zero amplitude (arbitrary units) and to gradually rise up to a peak of 100 at the leading undershoot and then gradually to fall back down to a transition point at zero, whereupon the central pulse 10 begins to fall to a low point of −850. The central pulse 10 then rises back up to a zero point, whereupon the trailing undershoot 14 begins its ascent to approximately 60 units and thereafter descends to zero, where waveform T terminates. Therefore, looking at the isolated waveform T of FIG. 1, it may be said that the leading undershoot 12 is defined between the first two zero points A, B, the central pulse being defined between the second and third zero points B, C, and the trailing undershoot being defined between the third and fourth zero points C, D Furthermore, in relative size, if waveform T were measured as a 500 nanosecond pulse from the first to the fourth zero point, it typically would have about a 250 nanosecond duration from the second to the third zero point, for the duration of the central pulse. The waveform shown in FIG. 1 is representative of a red signal from a head with 90° sidewalls such as generated by the configuration of FIG. 2a. The magnitude of the leading undershoot is 12.4% relative to the magnitude of the central pulse 10.

However, in practice, many bits of data are sought to be densely packed on a recording medium. Hence, the desire for high signal-to-noise ratio directs attention to the need for reduction of interference from overlapping leading and trailing undershoots which impinge upon adjacent central pulse portions of transitions being read by the head. Where the undershoots 12 and 14 overlap with the central portion 10 of preceding or succeeding pulses, amplitude changes and peak shifts will be noted. These amplitude changes can result from the partial enhancement and cancellation of the central portion by the overimpinging information from the prior or next pulse undershoot, with peak shifts causing the peak of the central portion to be displaced in time away from its ideal location at the center of the waveform.

Figure 2A:
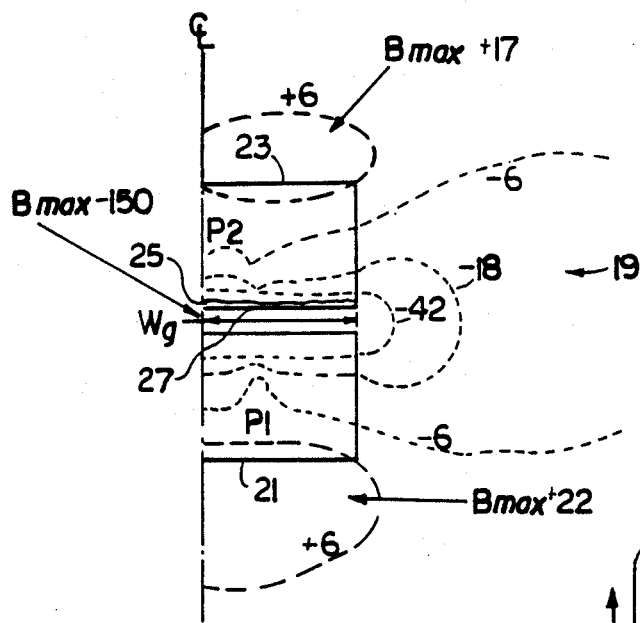
FIG 2a is a cross-sectional view of half of the longitudinal magnetic field distribution from a magnetic recording head having rectangular poles.

Turning to FIG. 2a, a view of an exemplary magnetic recording head 19 is shown as seen by the magnetic recording medium. It will be noted, however, that only one half of the head 19 is shown from the track center line. The head is comprised of two rectangular pole pieces, P1 and P2, defining a gap g therebetween. Furthermore, in FIG. 2a field contours have been plotted upon and in relation to head 19 and pole pieces P1, P2 and gap g. Thus, it will be seen in FIG. 2a that around the leading horizontal wall 21 of pole piece P1 a contour of plus six is defined in the longitudinal direction. In this exemplary embodiment, maximum field intensity (B max) is identified at a level of plus twenty-two at a point within this first contour. Next, it will be seen that a second contour is defined which encompasses a portion of pole P1 and a portion of pole P2 substantially centered about gap g and having a flux density of −6. Within this −6 contour it will be seen that a −18 contour is defined having a −42 contour defined therein, all substantially centered about gap g.

The maximum flux density at the gap itself is shown as equal to −150. An additional contour is shown partially including and extending beyond the upper wall 23 of pole piece P2 having a flux density of +6, and within which a location is identified as having maximum flux density of +17. Of course, it will be appreciated that gradients will be defined within and between the contours shown, such that, for example, the flux density in a thin region 25 located adjacent wall 27 of pole piece P2 will be between −42 and −150 units. Likewise, the upper wall 23 of pole piece P2 inside the +6 contour ring will have a flux density somewhere within the range of +6 and +17.

It will be appreciated that the magnetic recording medium will pass by the pole pieces and the gap from P1 to g to P2 in the direction indicated by the arrow in FIG 2a. For that reason, the influence that pole piece P1 has upon the medium during recording will be overridden by the flux at the ga and at the adjacent region of pole piece P2. The track width of recorded data created in the medium caused by the action of the recording head 19 will be approximately the width Wg of the recording head at the gap, except for fringing.

In the read cycle, however, the fields at the leading edge of pole piece P1 and at the trailing edge of pole piece P2 will both have an influence upon the waveform derived from the recording medium. In fact, the longitudinal field leading pole piece P1 will cause a major component of leading undershoot 12 and the longitudinal field attendant upper wall 23 of pole piece P2 will impose a significant portion of trailing undershoot 14 upon the waveform T.

It will be appreciated by those skilled in the art that FIG. 2a only plots the contours of longitudinal fields for the rectangular poles. Corresponding contours could be drawn for transverse fields of magnetic recording head 19, but have been omitted for simplicity of description only. Nevertheless, these transverse fields also impact upon the undershoots. In fact, the transverse signal may be thought of as being sinusoidal about the center of waveform T, such that it is additive and contributes to the leading undershoot 12 and is subtractive and lessens the trailing undershoot 14.

One characteristic of a recording medium is its coercivity. This is the amount of magnetic field needed to change the magnetic medium from one magnetic state to another. For example, if the coercivity of a recording medium used in conjunction with the head 19 of FIG. 2a were established at a value of 50 (in the same arbitrary units as used in FIG. 2a) then as the medium approached gap g, it would eventually be subjected to a field which is equal to and then greater than the coercivity value. As a result, a state change would be effected in the medium. As the medium continued to pass in the direction of the arrow past the gap region, further areas of the magnetic field (below 50 units) would be insufficient to change the state just recorded.

A more detailed description of the recording function in conjunction with behavior of the field of the pole pieces will be explained with respect to FIG. 2b, which is a view from the recording medium of the longitudinal magnetic field distribution from pole pieces P1 and P2 of a trapezoidal recording head 29. Again, it will be appreciated that only the right half of the trapezoidal recording head is shown from the center line. Also, contour lines are drawn only showing the longitudinal field. Furthermore, one half of the track on the recording medium which is created during the write function of the recording head is indicated by the double ended arrow extending between the center line and a line parallel thereto. This arrow further indicates that the track width is essentially defined by the width of gap g, except for fringing.

It is a characteristic of the recording medium that the characteristics of the magnetic field of the recording head in the write mode will cause a corresponding magnetic alignment of the material in the magnetic storage medium. By the principle of reciprocity, this recorded information will tend to cause a like response in the recording head during the read mode. Hence, all other things being equal, a head which has a longitudinal flux pattern at its gap ten microns wide might create a ten micron wide track on the medium, except that transverse field components which may lie at the fringes of the gap may extend the transition width. As a result, the magnetization in the recorded track may appear to gradually translate from substantially longitudinal in the center of the track to substantially transverse out at the track edge corresponding to substantially longitudinal fields at the head center and substantially transverse fields at the sides of the head.

Thus it will be appreciated that the longitudinal fields of the magnetic head 29 will cause the magnetization of the medium to be oriented in that same longitudinal direction. Hence, where the magnetic medium travels in a longitudinal direction indicated by the arrow of FIG. 2b, and where there are no transverse fields imposed on the medium, then the magnetization will be substantially oriented along the longitudinal axis. However, where there are transverse fields and insubstantial longitudinal fields, the magnetic charges will be oriented transverse to the longitudinal axis.

Figure 2C:
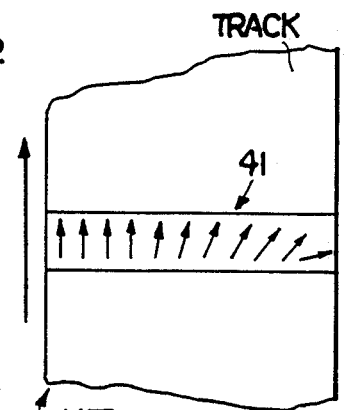
FIG. 2c is a representation of one-half of a transition recorded on a recording medium.

Referring to FIG. 2c, which is a conceptual view of a recorded track on a magnetic medium, a transition 41 is shown comprised of a multiplicity of charges. These charges have an orientation based upon the longitudinal or transverse characteristics of the field having been impinged thereupon, with each charge indicated by an elongated arrow. A first portion of charges is aligned longitudinally indicative of a fairly strong longitudinal field with minimal transverse components having influenced these charges. However, as the charges begin to approach the outside of the track (which corresponds to the outside edge of the head where transverse fields are strongest) the charges gradually begin to assume a transverse orientation (representative of a diminishing longitudinal and an increasing transverse field influence). It should be further appreciated that transition 41 is representative of one half of a track as could be recorded by the one half of a head shown in FIGS. 2a or 2b.

The amplitude generated by the recording head 29 upon reading transition 41 essentially will be determined by the magnetization pattern on the track and their location relative to the fields of the head with which they interact. Furthermore, in general, a longitudinal field will not convolve with a magnetization pattern in the medium which has been oriented substantially transversely. Likewise, a transverse field will not convolve with a substantially longitudinally oriented magnetization pattern in the transition.

Returning to FIG. 2a, it will be seen that where the recorded transition begins to come adjacent to recording head 19 the magnetization of the medium will first interact with the magnetic field at the leading edge 21 of pole piece P1 as will create the leading undershoot 12. As the transition is read by the gap it will create the central pulse 10. As the transition is read at the trailing edge 23 of pole piece P2, the trailing undershoot 14 will be read. Hence, these three regions are the regions of interest during the reading function of the magnetic head, the internal portions of the pole pieces P1 and P2 resulting in low fields, except for high transverse fields along the sidewalls.

It will be recalled that the magnetization pattern of the transition will have been aligned during the write cycle according to the longitudinal and transverse fields of pole P2 at region 25. Hence, longitudinal and transverse components, as written, characteristic of the field at region 25, can determine undershoots 12 and 14 when read by the head. For example, as seen in FIG. 1, undershoot 12 peaks at 100 units and may have a longitudinal component of 80 units and a transverse component of 20 units for the configuration of FIG. 2a. Undershoot 14 peaks at 60 units, which includes a longitudinal component of 80 units combined with a transverse component of −20 units, for the configuration of FIG. 2a. Hence, it will be understood that the transverse component is asymmetrical, adding to the leading undershoot and reducing the trailing undershoot.

It should also be appreciated that a rectangular pole geometry, as in FIG. 2a, leads to large transverse fields in the fringe zones and also at the outer edges of the poles.

Returning now to FIG. 2b, it will be seen that the trapezoidal confiquration of head 29 includes a shortened outside wall 33 of pole piece P2 and an elongated wall 31 of pole piece P1. Nevertheless, the width of the gap, as measured at wall 37 of pole piece P2, remains equal to Wg, which is also given as the width of the track.

Figure 2B:
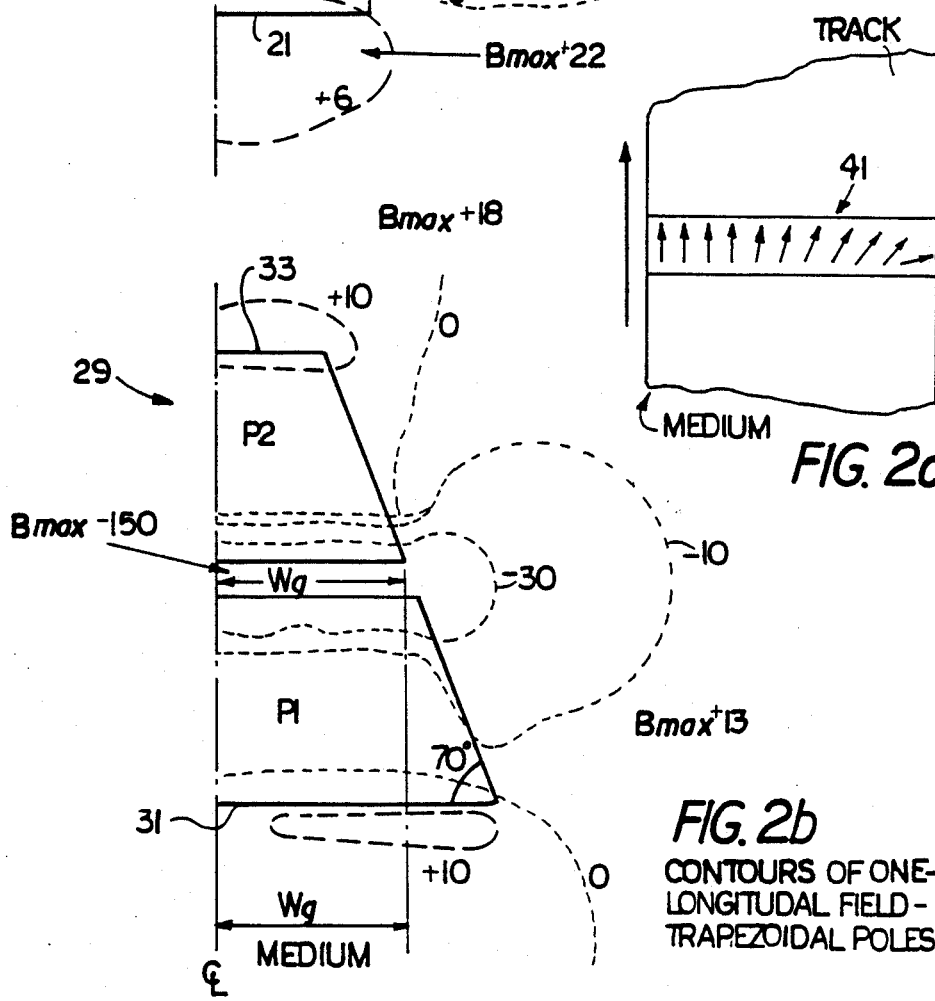
FIG. 2b is a cross-sectional view of half of the longitudinal magnetic field distribution from a magnetic recording head having trapezoidal poles.

However, according to the confiquration of FIG. 2b, the wider outer edge of pole P1 at its wall 31 pushes out the transverse field in a transverse direction (away from the center line). Therefore, an offset is introduced between where the transverse component exists in the transition as recorded at pole P2 near the gap and where the transverse field is pushed out to the outer edge of pole P1 during read. Hence, as the transverse field is extended further out, this offset reduces most of the contribution to the leading undershoot from the transverse magnetization that now will not be read by the substantially longitudinal fields at pole P1. As a result, the leading undershoot waveform becomes shallower, perhaps reduced to 80 units, having lost the 20 unit transverse field contribution. As well, the maximum longitudinal field having been reduced from +22 to +13 results in a lower value of longitudinal component read at pole P1, for example 60 instead of 80 units. Hence, the leading undershoot 12 can be reduced from 100 units to 60 units by this arrangement. Furthermore, shallower undershoots contain fewer high frequency components to interfere with the central pulse 10 and produce less of a peak shift as will displace location of the central pulse peak within the detection window.

The trapezoidal portion of the P2 pole in FIG. 2b results in the outer edge 33 of P2 pole being narrower compared to its width at the gap. This is counterproductive in that the maximum value of the negative longitudinal field is actually increased in this case, from the +17 of FIG. 2a to the +18 of FIG. 2b. However, such a narrower edge width confines the active region of the pole P2 during read to a small part of the longitudinal component of the transition, thus reducing the read longitudinal signal substantially. Furthermore, the transverse field at the outer edge 33 from this new trapezoidal pole piece P2, is offset transversely compared to where the transverse magnetization was recorded into the transition by the P2 pole at the gap. Such an offset negates the readback signal from the transverse recording, which increases the undershoot, but not as much as the decrease experienced from the lowered longitudinal signal read by P2. As stated earlier, the voltage from the transverse recording is actually reducing the trailing undershoot. Hence, this design of FIG. 2b will accomplish a reduction in the trailing undershoot only if the width at the outer edge of P2 is made significantly narrower than the gap width so that the longitudinal component is reduced by an amount greater than the amount of increase suffered from elimination of the transverse signal.

Figure 3:
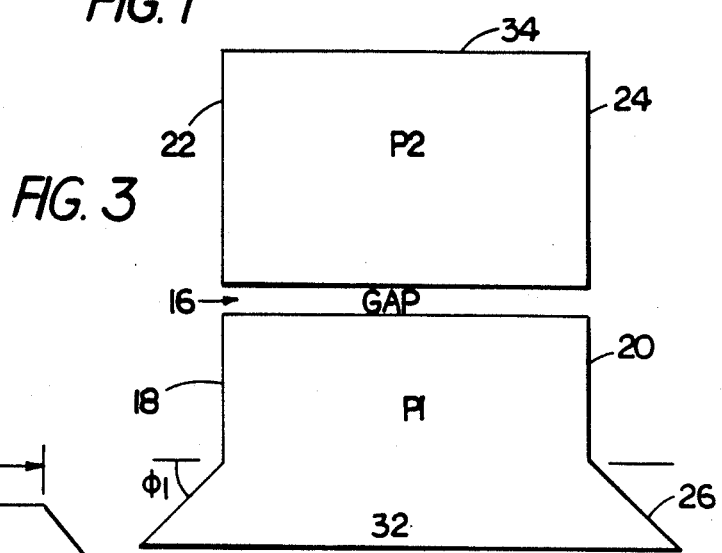
FIG. 3 is a cross-sectional view of the pole tips of a magnetic recording head made in accordance with the present invention.

Turning now to FIG. 3, which is a cross-sectional view of a first preferred embodiment of the present invention, pole tips P1 and P2 define a gap 16. Walls 18, 20, 22 and 24 are substantially at 90° with respect to gap 16. However, pole P1 further includes a trapezoidal portion 26. Preferably this portion has an angle $\phi_1$ in the range of 30° to 70°. In this embodiment, the size of the undershoots will depend on the widths of the poles P1 and P2, i.e. the width of wall 32 and wall 34, and the thicknesses of P1 and P2. In order to maintain the size of the undershoots at a low level, the width of outer edge 32 of pole P1 should be wider than the width at the gap, perhaps by a few microns.

Figure 4:
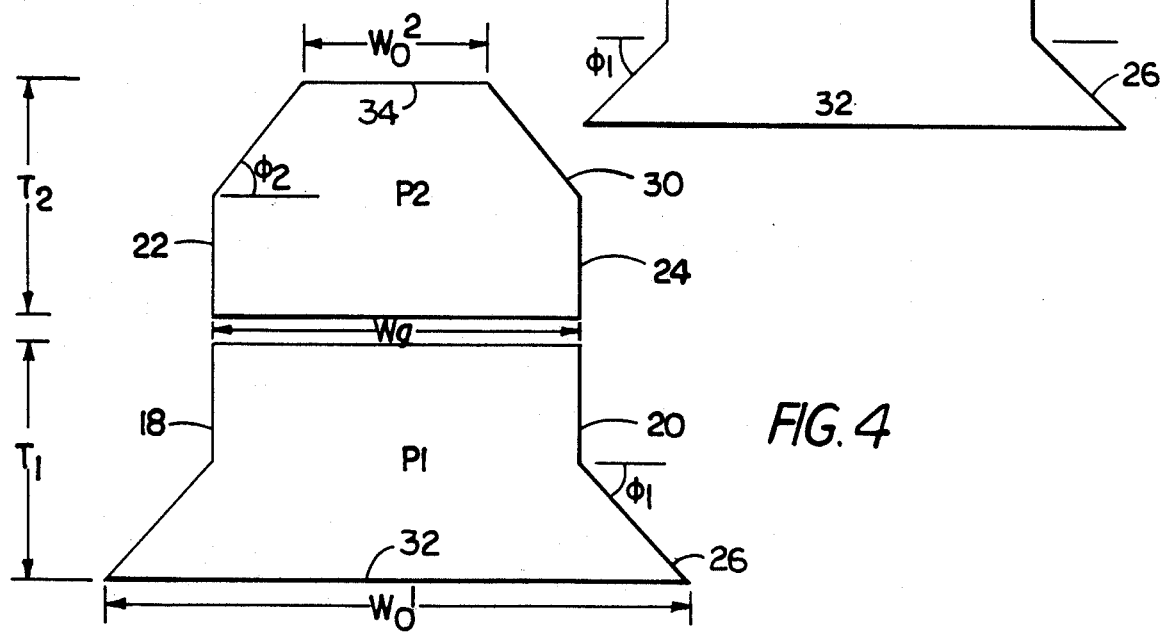
FIG. 4 is a cross-sectional view of the pole tips of a magnetic recording head made in accordance with the present invention.

Turning now to the embodiment of FIG. 4, there is shown a cross sectional view of the pole tips according to a second preferred embodiment of the present invention where again the walls 18, 20, 22 and 24 are substantially perpendicular to gap 16. In this embodiment, the pole piece P2 includes a trapezoidal portion 30, while pole P1 includes trapezoidal portion 26. The size of the undershoots, once again, will depend on the widths of outer edge 32 of pole P1 and outer edge 34 of pole P2. To keep the size of the undershoots small, width $W^1_o$ of pole P1 at the outer edge 32 should be a few microns wider than the width Wg at the gap. The width $W^2_o$ of outer edge 34 of pole P2 should at least be a few microns narrower than the width $W_g$. Angles $\phi_1$ and $\phi_2$ preferably should be in the range of 30–70° each. Furthermore, P1 and P2 should be made as thick as possible, where P1 pole height (or thickness) T1 and P2 pole height T2 each should be about three microns or greater.

The confiqurations of FIGS. 3 and 4 will reduce the fields and the width of the field region that lead to the undershoots sought to be reduced by the invention in the manner described above. These confiqurations prevent reading of transverse magnetizations in the media by the transverse head fields because the transverse fields have been offset during writing relative to the transverse fields of the head while reading the undershoots. This results in a higher signal-to-noise ratio for the head. In addition, the rectangular confiquration of each pole piece at the gap region leads to about a 0.25 micron reduction in write and read fringing at the gap compared to non-rectangular heads produced currently by the track trimming process. A reduction in fringing allows the poles to be made wider for a given track pitch, thus further increasing the head signal strength.

Referring again to the description of ion milling as part of the process for making thin film heads, it will be appreciated that the present invention is most easily achieved within the track trimming step of the recording head manufacturing process. In particular, pole P2 has been formed on top of pole P1 with an insulating gap defined in between. Both poles will have been plated to be considerably wider than the final pole width to be desired In such case, a thick resist is patterned by means of a mask on the P2 pole tip and over the rest of the yoke. The width of this pattern will ultimately determine the final gap width. By means of ion milling, the excess magnetic material along the width of the two poles will be removed. The resist pattern is then stripped from the top of P2, with a resulting cross-section of the pole tips being slightly trapezoidal, as suggested by the embodiment of FIG 2b.

However, if the milling is not allowed to proceed through the entire excess of width of the P1 pole, then a substantially trapezoidal portion 26 will also be defined on pole piece P1. This is the geometry shown for pole piece P1 in FIGS. 3 and 4. A resist pattern is formed on pole P2 using a narrowed mask and is followed by an ion milling step in order to realize the trapezoidal geometry shown for pole piece P2 in FIG. 4.

Other embodiments are within the present invention. For example, where pole tips have been described having rectangular and trapezoidal regions, such pole tips can be defined as having reduced and enlarged regions of whatever geometry and can be fabricated without the use of the ion-milling process. The latter configuration will function in a manner analogous to the embodiments described above.

These and other embodiments are within the spirit and scope of the present invention, and it is intended that all modifications and variations be included within the scope of the appended claims.

What is claimed is:

1. A magnetic recording head having at least two poles, each pole terminating in a pole tip in a plane defining an air bearing surface for cooperation with a magnetic medium operating essentially parallel to the air bearing surface, the medium moving in an operational direction so as to establish an operationally first of the poles and then an operationally second of the poles, the pole tips separated by a gap layer extending in width transversely between the pole tips and essentially transverse to the medium operational direction, each pole tip having a pair of sidewalls, the head comprising a first region and a transversely narrower second region defined by the tip of the first pole in the plane of the air bearing surface, the second region being adjacent to the gap layer, respective sidewalls of the first region being non-parallel with each other and not colinear with respective sidewalls of the second region, and the tip of the second pole having a maximum transverse width which is less than or equal to the transverse width of the first pole tip adjacent to the gap layer.

2. The head of claim 1 wherein the area of the second pole tip in the plane of the air bearing surface is less than the area of the first pole tip.

3. The head of claim 1 wherein the first region is the first pole tip and the second region is the second pole tip.

4. The head of claim 1 wherein the second region has sidewalls which are non-parallel.

5. The head of claim 4 wherein the area of the second pole tip in the plane of the air bearing surface includes a third and fourth region, the third region being adjacent to the gap layer, and the area of the third region being greater than the area of the fourth region.

6. The head of claim 5 wherein the third region comprises a rectangle and the fourth region comprises a trapezoid, and the first pole tip includes a trapezoid.

7. The head of claim 4 wherein the non-parallel sidewalls are at angles between 30 and 70 degrees relative to the gap layer.

8. The head of claim 1 wherein the non-parallel sidewalls are at angles between 30 and 70 degrees relative to the gap layer.

9. The head of claim 1 wherein the first pole tip comprises a trapezoid.

10. The head of claim 9 where the second region comprises a rectangle.

11. The head of claim 9 wherein the second pole tip comprises a rectangle.

12. The head of claim 1 wherein the first pole tip has a leading edge wider than the gap layer width.

13. The head of claim 12 wherein the second pole tip has a trailing edge narrower than the gap layer width.

14. The head of claim 12 wherein the first pole tip leading edge width is a few microns greater than the gap layer width.

15. The head of claim 14 wherein the second pole tip trailing edge is a few microns narrower than the gap layer width.

16. The head of claim 12 wherein the second pole tip trailing edge is a few microns narrower than the gap layer width.

17. The head of claim 1 wherein the second pole tip has a trailing edge narrower than the gap layer width.

18. The head of claim 1 wherein the thickness measured along the longitudinal axis of the head of each pole tip is about three microns.

19. A magnetic recording head having at least two poles, each pole terminating in a pole tip in a plane defining an air bearing surface for cooperation with a magnetic medium operating essentially parallel to the air bearing surface, the medium moving in an operational direction so as to establish an operationally first of the poles and then an operationally second of the poles, the pole tips separated by a gap layer extending in width between the pole tips along a transverse axis of the head essentially transverse to the medium operational direction, each pole tip having a pair of sidewalls generally extending along a longitudinal axis of the head and generally along the medium operational direction, the head comprising a first region and a transversely narrower second region, the first and second regions being defined by the tip of the first pole in the plane of the air bearing surface, the second region being adjacent to the gap layer, respective sidewalls of the first region being flared at between about 30° to 70° from the transverse axis, and the tip of the second pole having a maximum transverse width which is less than or equal to the transverse width of the first pole tip adjacent to the gap layer.

20. The head of claim 19 wherein respective sidewalls of the second region are flared at between about 30° to 70° from the transverse axis.

21. The head of claim 19 wherein the second pole tip comprises two regions, a first region of the second pole tip being adjacent to the gap layer and the sidewalls of the second region of the second pole tip are flared at between about 30° to 70° from the transverse axis.

22. The head of claim 19 wherein the first pole tip has a leading edge wider than the gap layer width.

23. The head of claim 22 wherein the second pole tip has a trailing edge narrower than the gap layer width.

24. The head of claim 22 wherein the first pole tip leading edge width is a few microns greater than the gap layer width.

25. The head of claim 24 wherein the second pole tip trailing edge is a few microns narrower than the gap layer width.

26. The head of claim 22 wherein the second pole tip trailing edge is a few microns narrower than the gap layer width.

27. The head of claim 19 wherein the second pole tip has a trailing edge narrower than the gap layer width.

28. The head of claim 19 wherein the thickness measured along the longitudinal axis of the head of each pole tip is about three microns.

29. A magnetic recording head having at least two poles, each pole terminating in a pole tip in a plane defining an air bearing surface for cooperation with a magnetic medium operating essentially parallel to the air bearing surface, the medium moving in an operational direction so as to establish an operationally first of the poles and then an operationally second of the poles, the pole tips separated by a gap layer extending in width transversely between the pole tips and essentially transverse to the medium operational direction, each pole tip having a pair of sidewalls, the head comprising a trapezoidal region and a transversely narrower rectangular region defined by the tip of the first pole in the plane of the air bearing surface, the rectangular region being adjacent to the gap layer, and the tip of the second pole having a maximum transverse width which is less than or equal to the transverse width of the first pole tip adjacent to the gap layer.

30. The head of claim 29 wherein the sidewalls of the trapezoid are at angles between 30 and 70 degrees relative to the transversely extending gap layer.

31. A magnetic recording head having at least two poles, each pole terminating in a pole tip in a plane defining an air bearing surface for cooperation with a magnetic medium operating essentially parallel to the air bearing surface, the medium moving in an operational direction so as to establish an operationally first of the poles and then an operationally second of the poles, the pole tips separated by a gap layer extending in width transversely between the pole tips and essentially transverse to the medium operational direction, each pole tip having a pair of sidewalls, the head comprising a trapezoidal region and a transversely narrower rectangular region defined by the tip of the first pole in the plane of the air bearing surface, and a trapezoidal region and a rectangular region defined in the tip of the second pole in the plane of the air bearing surface, the first pole tip rectangular region and the second pole tip rectangular region both being adjacent to the gap layer, and the second pole tip having a maximum transverse width which is less than or equal to the transverse width of the first pole tip adjacent to the gap layer.

32. The head of claim 31 wherein the sidewalls of the trapezoids are at angles between 30 and 70 degrees relative to the transversely extending gap layer.

* * * * *